(12) United States Patent
Daoud et al.

(10) Patent No.: US 6,285,194 B1
(45) Date of Patent: Sep. 4, 2001

(54) CUSTOMER BRIDGE WITH BUILT-IN TEST ACCESS

(75) Inventors: Bassel Hage Daoud, Parsippany; George Andrew DeBalko, Washington, both of NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 08/940,759

(22) Filed: Sep. 30, 1997

(51) Int. Cl.[7] .............................. G01R 31/08; H04M 1/24
(52) U.S. Cl. ................................. 324/522; 379/26
(58) Field of Search ...................... 324/706, 691, 324/713, 512, 522; 439/504; 379/21, 26, 27

(56) References Cited

U.S. PATENT DOCUMENTS

| 4,069,403 | * | 1/1978 | Beaudette | 200/51.12 |
| 4,513,176 | * | 4/1985 | Fostveit | 379/26 |
| 4,588,862 | * | 5/1986 | Grabowy | 379/27 |
| 5,622,518 | * | 4/1997 | Kalpaxis | 439/504 |
| 5,754,624 | * | 5/1998 | Sullivan | 379/27 |

OTHER PUBLICATIONS

Neward Electronics Catalog, 500 N. Pulaski Rd., Chicago, IL 60624, p. 355, 1989.*

* cited by examiner

*Primary Examiner*—Ernest Karlsen
(74) *Attorney, Agent, or Firm*—Birch, Stewart, Kolasch & Birch, LLP

(57) ABSTRACT

The present invention provides for a customer bridge used to couple a network line of a telecommunications system to customer equipment and has a SPST normally open switch which when closed connects an energy detecting device to the network line without disconnecting the network line from the customer equipment.

23 Claims, 5 Drawing Sheets

CUSTOMER BRIDGE WITH BUILT-IN TEST ACCESS

CROSS REFERENCES

This application is related to a commonly assigned and concurrently filed application entitled "Bridge with Built-In Test Access and Network Disconnect Features" filed on Sep. 30, 1997 with Ser. No. 08/940,759 and which is hereby incorporated by reference.

BACKGROUND OF THE INVENTION

1. Field of the Invention

The present invention relates to customer bridges used at the site of customers of telecommunication networks and more particularly to customer bridges that allow customers to quickly determine the origin of any malfunction in the wiring connected to the customer bridges.

2. Description of the Related Art

Customer bridges are devices that are used to demarcate a customer's equipment and a telecommunications network. The customer bridge is part of a telecommunications system and is connected directly to customer equipment and to the telecommunications network. The customer bridge has network terminals on its network side and customer terminals on its customer side. A network line (e.g., twisted pair of wires) is connected to the network side of the customer bridge which electrically couples the network line to the customer terminals which typically have customer equipment (e.g., telephone, facsimile machine, modem) connected thereto.

At a customer's site such as buildings with multiple customers, a plurality of customer bridges are usually disposed in a housing commonly referred to as network interface unit typically mounted in a basement or in an outdoor environment with the network side of each bridge being connected to an individual network line. Network interface units also include other equipment such as protection circuitry used to prevent customer equipment from being damaged by voltage or current surges.

FIG. 1 depicts a prior art customer bridge 10 that includes a base member 12 which is typically made of plastic. At the customer side of the bridge, a pair of hollow cylindrical projections 14 and 16, typically molded from the same plastic of base member 12 and integral therewith contain electrical terminals which include posts 18 and 20 to which customer terminals 22 and 24 are electrically connected. The posts 18 and 20 extend to and through the bottom of base member 12. Wrapped around posts 18 and 20 are wires 26 and 28 respectively, which over most of their length are protected by sheath, 30. Wires 26 and 28 terminate in a standard well known RJ11 plug, 32. Plug 32 is shown inserted within base member 12 that contains an RJ11 plug mating member (not shown in FIG. 1; see FIG. 2) to which insulated wires 34 and 36 are connected. Thus, each insulated wire 34 and 36 is electrically connected to customer terminals 22 and 24 respectively when plug 32 is properly engaged to the RJ11 plug mating member (not shown) disposed within base member 12.

FIG. 2 shows a cross sectional view of the customer bridge 10 of FIG. 1. Mating member 38 is positioned within base member 12 so that its electrical contacts (not shown) engage with the electrical contacts (not shown) of plug 32. Insulated wires 34 and 36 emanating from mating member 38 are connected to the telecommunications network. Electrical wires 40 and 42 shown connected to customer terminals 22 and 24 provide the electrical connection to a customer device (not shown) such as a telephone, facsimile machine, modem and the like. Customer terminals 22 and 24 make electrical contact with top ends of terminals 44 and 46. The bottom ends of terminals 44 and 46 include posts 18 and 20 that extend beyond the bottom of base member 12.

Many times, a malfunction occurs in a network line and there is a need to determine whether the malfunction is located at the customer side or at the network side of the telecommunications system. In such circumstances, a customer unplugs RJ11 plug 32 electrically disconnecting the network side of the bridge from the customer side. The customer typically plugs into the customer bridge a working telephone handset to test the network line. Thus, for example, if a telephone handset is plugged in and the customer detects a dial tone and is able to dial a number and establish a connection, then it is reasonable to conclude that the problem lies with the customer's wiring and not with the network line. However, plugs such as RJ11 plugs are expensive and many times unreliable in outdoor environments where customer bridges are often located. Thus, many times a malfunction may be due to an inoperative RJ11 plug. Further, the use of a telephone handset or other telecommunications device to test a network line is often laborious and awkward as many times the customer has to go to a basement or to an outdoor location with a telephone, locate the line in question, disconnect the appropriate RJ11 plug and plug in its place a telephone.

SUMMARY OF THE INVENTION

The present invention provides a customer bridge that couples an energy detecting device to a customer line of a telecommunications system allowing any energy in the customer line to energize the energy detecting device such that the customer line can be tested for malfunctions.

The customer bridge of the present invention comprises an activating mechanism having a first terminal and a second terminal and an energy detecting device coupled to one of the first and second terminals such that when the activating mechanism is activated the energy detecting device is coupled to the other one of the first and second terminals of the activating mechanism.

BRIEF DESCRIPTION OF THE DRAWINGS

These and other features of the present invention are delineated in detail in the following description. In the drawing.

DETAILED DESCRIPTION

Figure 1:
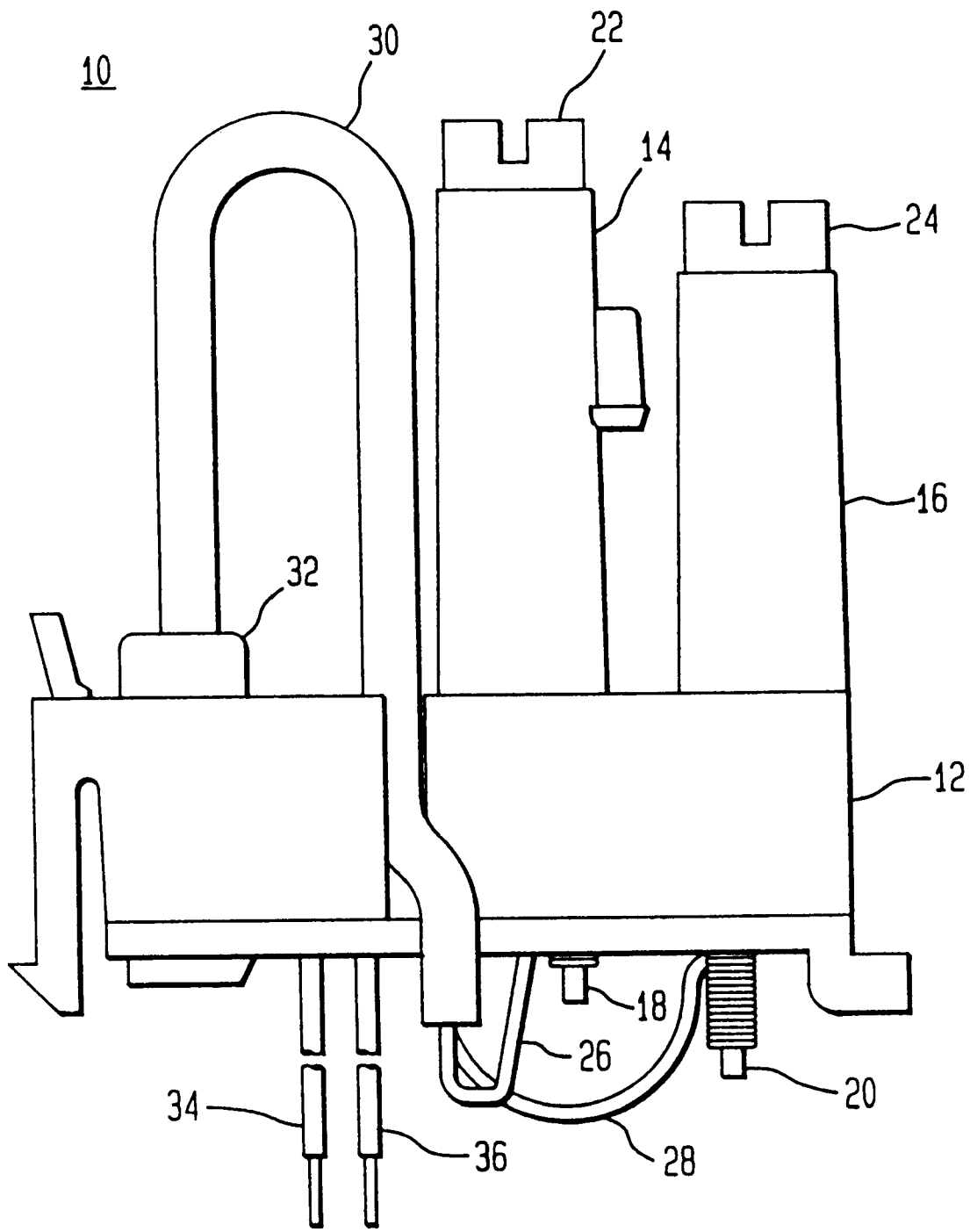
FIG. 1 is a front view of a prior art customer bridge.
Figure 2:
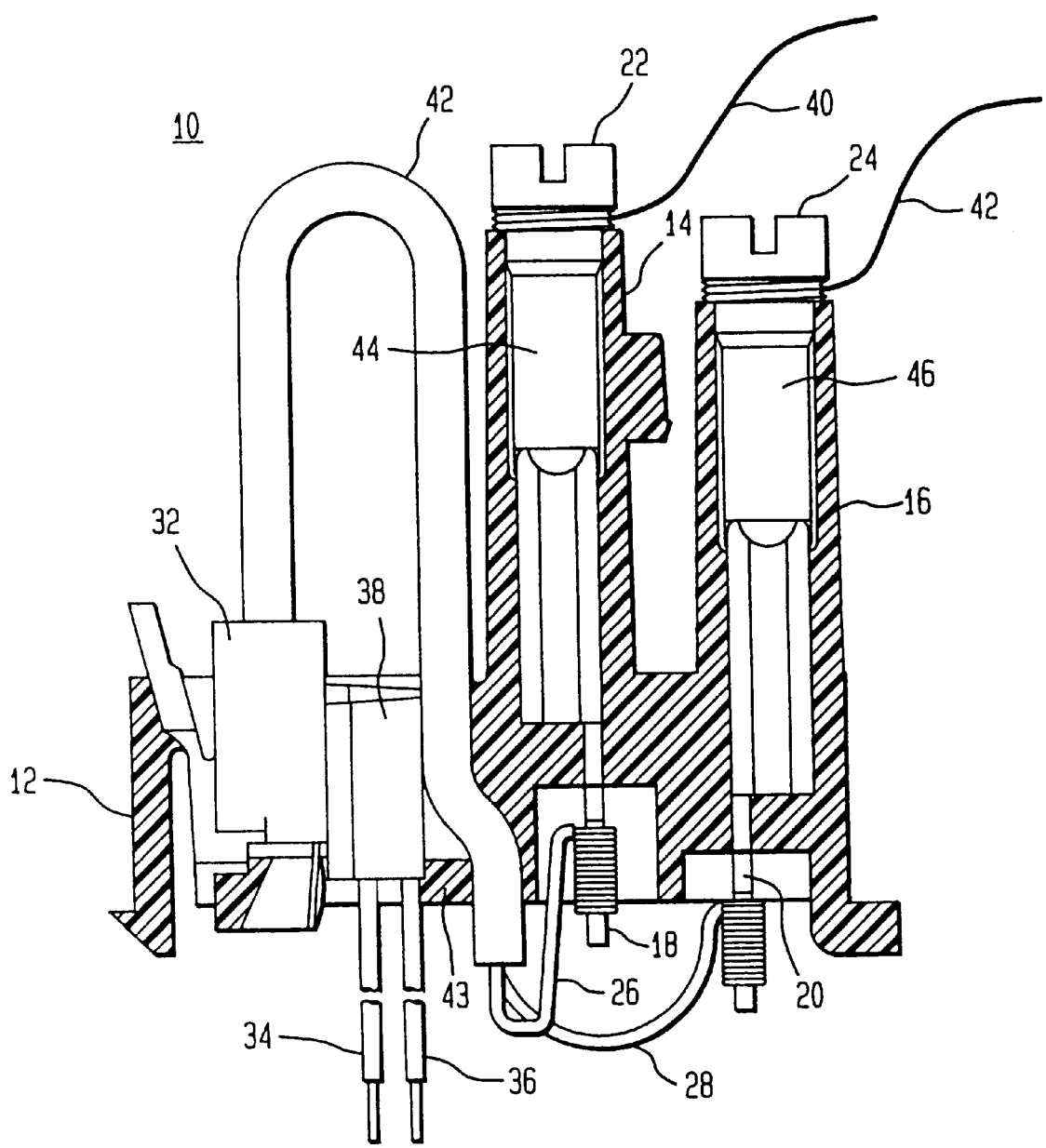
FIG. 2 is a cross sectional view of FIG. 1.
Figure 3:
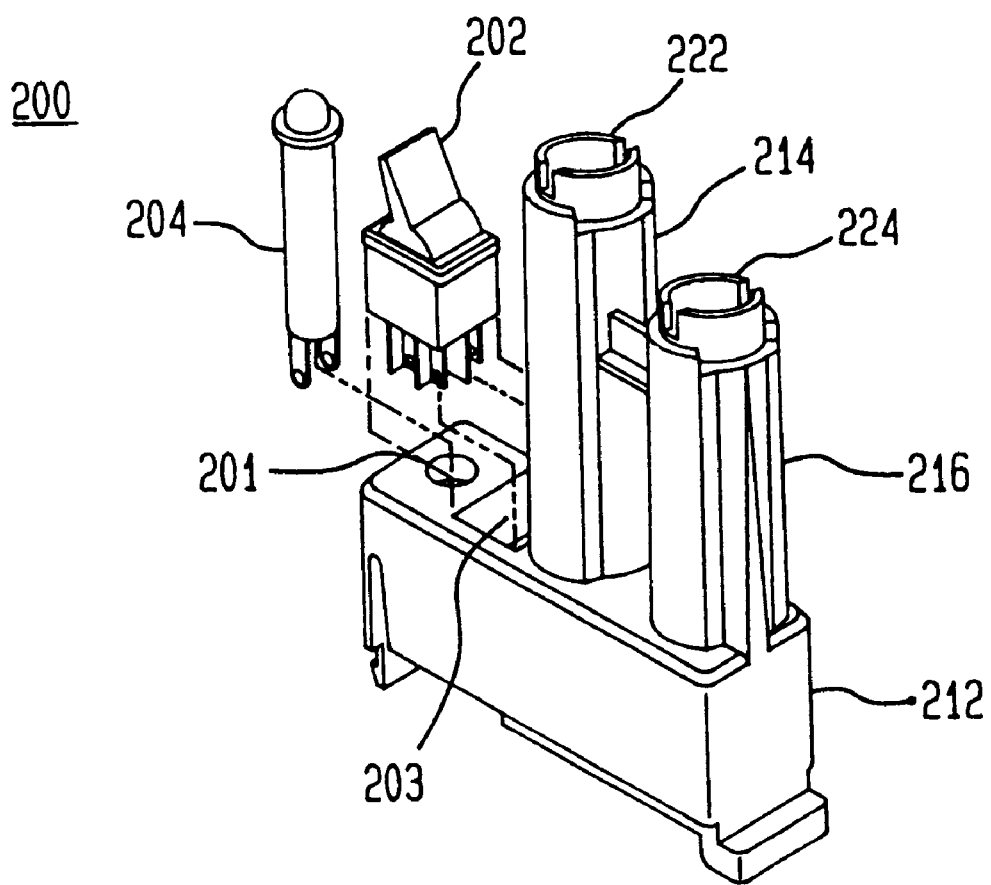
FIG. 3 is an exploded perspective view of the present invention.

Referring now to the drawings, FIG. 3 depicts customer bridge 200 of the present invention with switch 202 used as an activating mechanism disposed within base member 212 through opening 203. Light emitting diode (LED) 204 used as an energy detecting device is positioned within base member 212 through opening 201.

Figure 4:
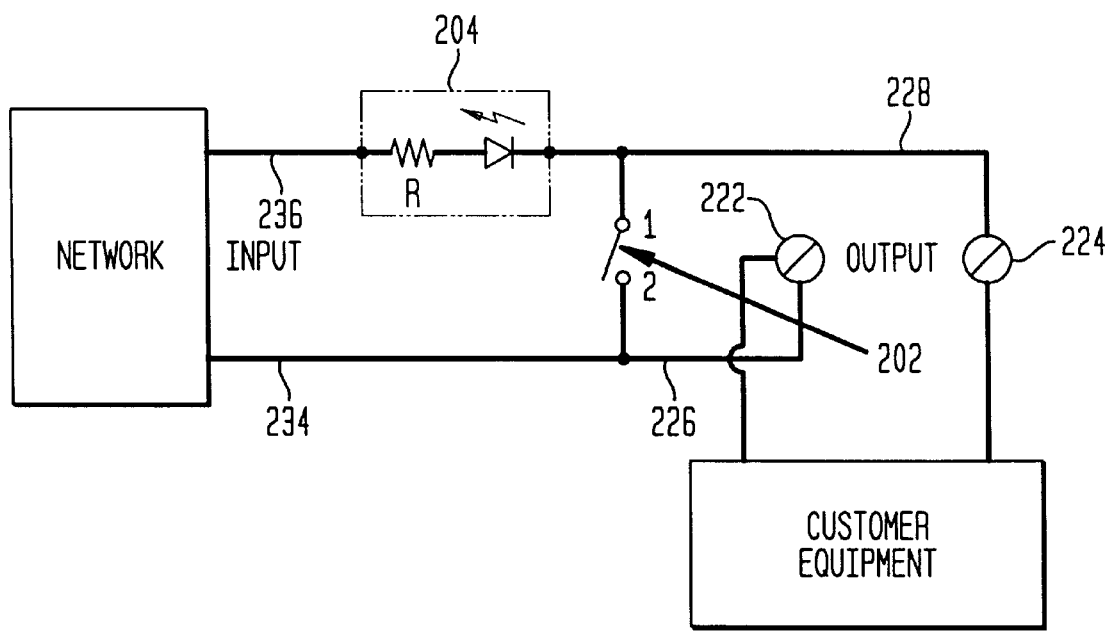
FIG. 4 is an electrical schematic of the present invention.

FIG. 4 shows a schematic of the customer bridge of the present invention wherein switch 202 is a normally open single pole single throw (SPST) toggle switch and LED 204 included a series resistor R. LED 204 is shown connected in series with one leg of the pair of network lines 234 and 236. Switch 202 has contact 1 connected to customer terminal 224 via insulated wire 228 and contact 2 connected to customer terminal 222 via insulated wire 226. The term contacts as used herein can be any points in an electrical circuit which are electrically connected to contacts 1 and 2 of switch 202. Customer terminals 222 and 224 which are placed within hollow projections 214 and 216 make electrical contact with binding posts 218 and 220 (see FIG. 7). Electrical wires 234 and 236 form part of the network line originating from a telecommunications network. When switch 202 is closed contact 1 is electrically connected to contact 2 thus electrically coupling LED 204 to the network line. Typically, network lines of telecommunications network such as the Public Switched Telephone Network (PSTN) contain detectable energy (e.g., dial tone of a certain voltage and current). Thus when network line comprising wires 234 and 236 is being used by a customer, the current present in the line flows through LED 204 energizing LED 204 causing it to emit visible light. When switch 202 is closed, regardless of whether the network line is active or idle, the closed switch shorts out the customer terminals and any device connected thereto and couples LED 204 to the network line allowing any energy present in the network line to flow through LED 204 and resistor R causing the LED to emit visible light. It is in this manner that the network line can be tested by a customer without having to disconnect the network line from the customer terminals. Thus, when a malfunction occurs in a network line, a customer can simply close switch 202 of customer bridge 200 to determine whether the malfunction is located at the network side of the bridge or at the customer side of the bridge without having to disconnect the customer terminals from the network line.

Figure 5:
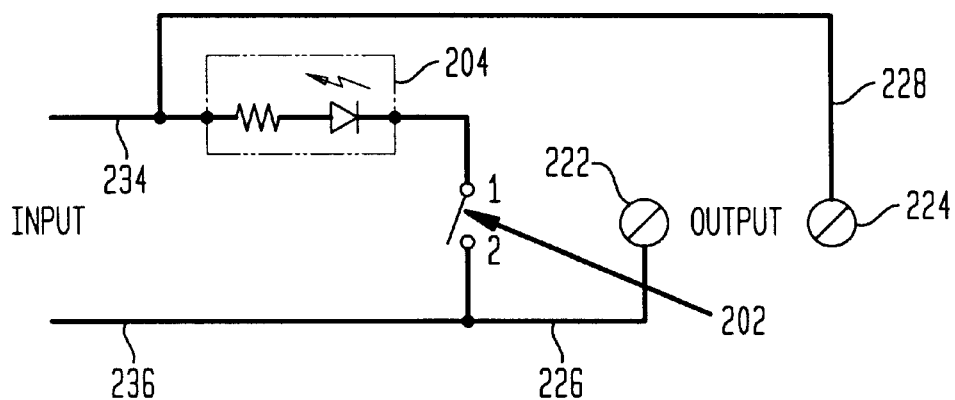
FIG. 5 is an electrical schematic showing an alternate wiring arrangement of the present invention in its testing mode.

FIG. 5 shows an alternate wiring arrangement for switch 202 and LED 204 of the present invention. When switch 202 is closed, an electrical path for any energy present in the network line is created through resistor and LED 204. If the network line is active when switch 202 is closed, a portion of the energy present in the network line will flow through resistor R and LED 204 which may temporarily interrupt the activity in the network line. The value of resistor R can be such that the amount of energy flowing through the LED will cause the LED to emit visible light even when an active customer device is connected to customer terminals 222 and 224.

Figure 6:
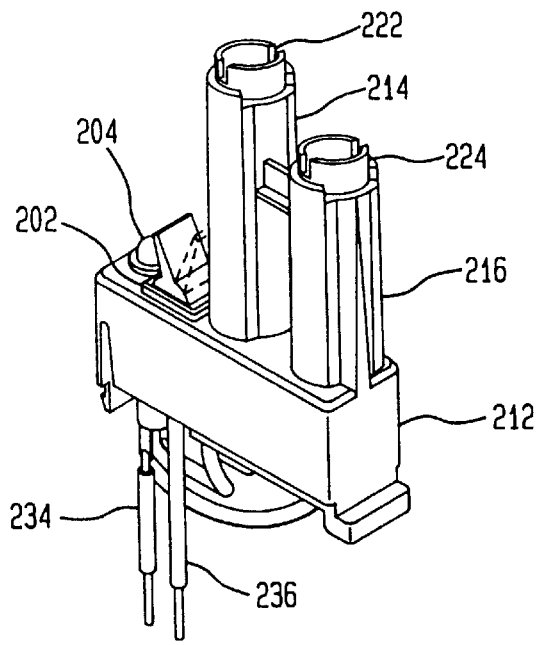
FIG. 6 is a perspective view of the present invention with switch shown in two positions.
Figure 7:
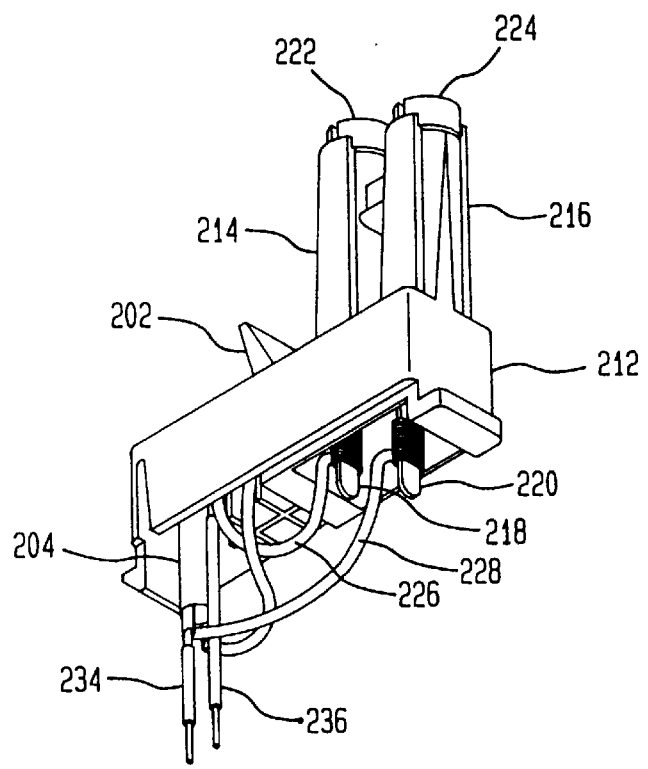
FIG. 7 is a perspective view of the present invention showing how the actual wiring is implemented.

FIGS. 6 shows the present invention depicting switch 202 in its open position and closed position (dashed lines). FIG. 7 shows an illustrative implementation of the wiring within the customer of the present invention. Customer terminals 222 and 224 are used to connect customer equipment. The network line from a telecommunications system is connected to wires 234 and 236.

It should be noted that in addition to LED 204, the customer bridge of the present invention can use other types of energy detecting devices that allow a customer to determine whether a network line is functioning. For example, a buzzer or beeping device that emits an audible sound when the SPST of customer bridge 200 is closed can be used to test a network line. The energy detecting device used may be polarity sensitive. As such, any well known polarity guard device may be used in conjunction with the energy detecting device to allow the energy detecting device to function properly. Depending on the medium (e.g., twister pair wires, coax cables) used for a network line, there may be only one customer terminal and one network terminal.

It should be noted further that the switch device can be any electrical, electromechanical or optical device having an activating mechanism which when activated couples (electrically, optically) one point of a circuit to another point of the circuit. The activating mechanism can be any device (e.g., a SPST momentary pushbutton switch) that provides a coupling and/or uncoupling function between two points in a circuit.

We claim:

1. A customer bridge comprising:
   a housing having snap-in features for attaching said housing to a network interface unit, said housing including:
   first and second network terminals for coupling to first and second network lines;
   first and second customer terminals for coupling to first and second customer lines;
   a single pole, manually operable switch having first and second switch terminals, said second switch terminal being connected to said second network terminal; and
   an energy detecting device coupled in series between said first switch terminal and said first network terminal, wherein closing of said manually operable switch results in connecting said first network terminal to said second network terminal via said energy detecting device and said manually operable switch.

2. The customer bridge according to claim 1, wherein said manually operable switch is a single throw, normally open switch.

3. The customer bridge according to claim 1, wherein said energy detecting device includes a light emitting diode.

4. The customer bridge according to claim 3, wherein said energy detecting device further includes a resistor connected in series with said light emitting diode.

5. The customer bridge according to claim 1, further comprising:
   a base member, wherein said manually operable switch is positioned within said base member and wherein said energy detecting device is also positioned within said base member.

6. The customer bridge according to claim 5, wherein said energy detecting device is positioned adjacent to said manually operable switch.

7. The customer bridge according to claim 1, wherein said second switch terminal is connected to said second customer terminal.

8. The customer bridge according to claim 1, wherein said first switch terminal is connected to said first customer terminal.

9. The customer bridge according to claim 8, wherein said second switch terminal is connected to said second customer terminal.

10. The customer bridge according to claim 1, wherein said first network terminal is connected to said first customer terminal.

11. The customer bridge according to claim 10, wherein said second switch terminal is connected to said second customer terminal.

12. A network interface unit comprising:
   a plurality of customer bridges, with each customer bridge including a housing attached to said network interface unit, each housing including:

first and second network terminals for coupling to first and second network lines;

first and second customer terminals for coupling to first and second customer lines;

a single pole, manually operable switch having first and second switch terminals, said second switch terminal being connected to said second network terminal; and an energy detecting device coupled in series between said first switch terminal and said first network terminal, wherein closing of said manually operable switch results in connecting said first network terminal to said second network terminal via said energy detecting device and said manually operable switch.

13. The network interface unit according to claim 12, wherein said manually operable switch is a single throw, normally open switch.

14. The network interface unit according to claim 12, wherein said energy detecting device includes a light emitting diode.

15. The network interface unit according to claim 14, wherein said energy detecting device further includes a resistor connected in series with said light emitting diode.

16. The network interface unit according to claim 12, further comprising:

a base member, wherein said manually operable switch is positioned within said base member and wherein said energy detecting device is also positioned within said base member.

17. The network interface unit according to claim 16, wherein said energy detecting device is positioned adjacent to said manually operable switch.

18. The network interface unit according to claim 12, wherein said second switch terminal is connected to said second customer terminal.

19. The network interface unit according to claim 12, wherein said first switch terminal is connected to said first customer terminal.

20. The network interface unit according to claim 19, wherein said second switch terminal is connected to said second customer terminal.

21. The network interface unit according to claim 12, wherein said first network terminal is connected to said first customer terminal.

22. The network interface unit according to claim 21, wherein said second switch terminal is connected to said second customer terminal.

23. The network interface unit according to claim 12, wherein the housing of each customer bridge is separate from the housings of the other customer bridges.

* * * * *